(12) United States Patent
Roth et al.

(10) Patent No.: US 6,777,054 B1
(45) Date of Patent: Aug. 17, 2004

(54) SECURITY LABEL LAMINATE

(75) Inventors: Joseph D. Roth, Springboro, OH (US); John C. Rosenbaum, Springboro, OH (US)

(73) Assignee: NCR Corporation, Dayton, OH (US)

( * ) Notice: Subject to any disclaimer, the term of this patent is extended or adjusted under 35 U.S.C. 154(b) by 2 days.

(21) Appl. No.: 10/396,057

(22) Filed: Mar. 25, 2003

(51) Int. Cl.[7] .............................................. B42D 15/00
(52) U.S. Cl. ..................... 428/40.1; 283/72; 283/81; 283/92; 428/42.1; 428/42.2; 428/42.3; 428/192; 428/194; 428/915; 428/916
(58) Field of Search ................ 428/40.1, 42.1, 428/42.2, 42.3, 192, 194, 915, 916; 283/72, 81, 92

(56) References Cited

U.S. PATENT DOCUMENTS

| | | | |
|---|---|---|---|
| 4,324,823 A | * | 4/1982 | Ray, III ........................ 428/43 |
| 4,889,234 A | | 12/1989 | Sorensen et al. |
| 5,591,290 A | | 1/1997 | Walter et al. |
| 5,885,677 A | * | 3/1999 | Gosselin et al. ........... 428/40.1 |

* cited by examiner

*Primary Examiner*—Nasser Ahmad
(74) *Attorney, Agent, or Firm*—Francis L. Conte, Esq.

(57) ABSTRACT

A security laminate includes a face sheet laminated to a liner by an adhesive. The face sheet includes a removable label. The liner is covered with a release coating behind the label, and has a rim along one edge which is devoid of the release coating except for a security pattern therein.

20 Claims, 3 Drawing Sheets

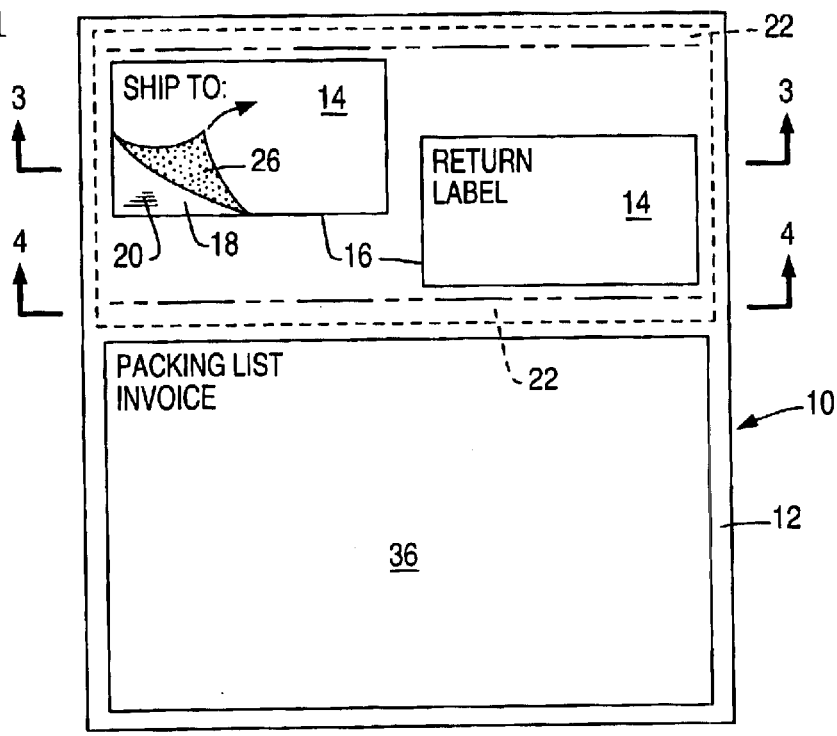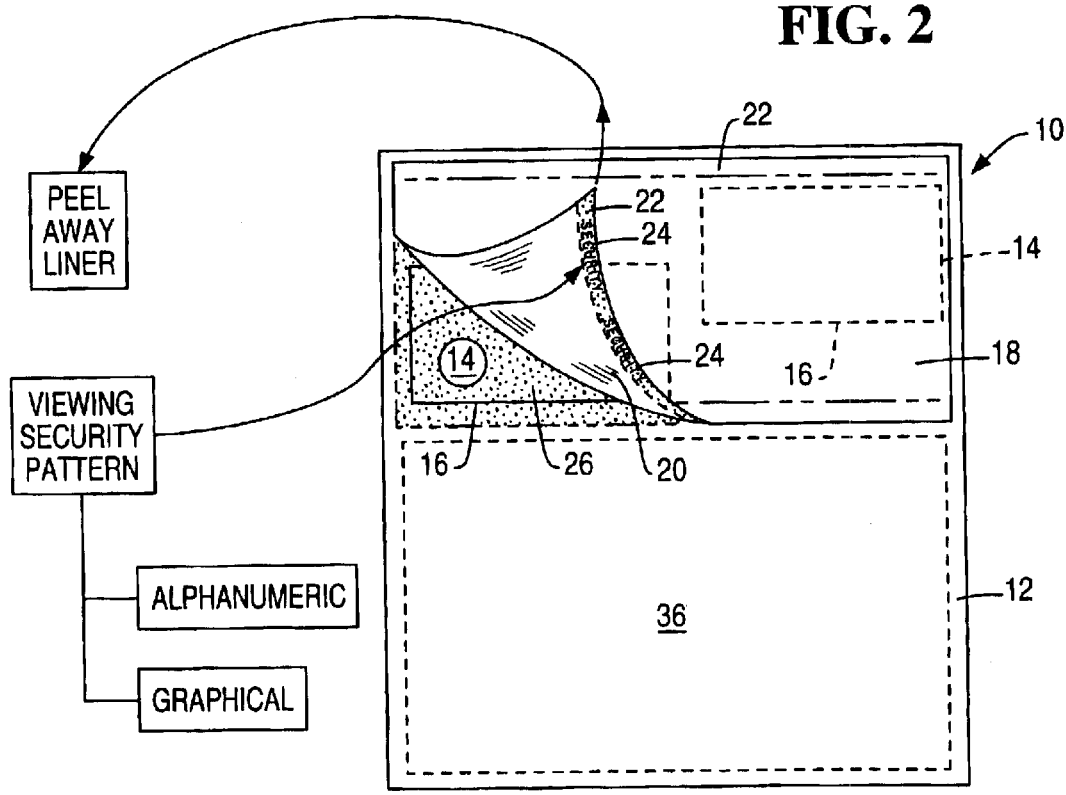

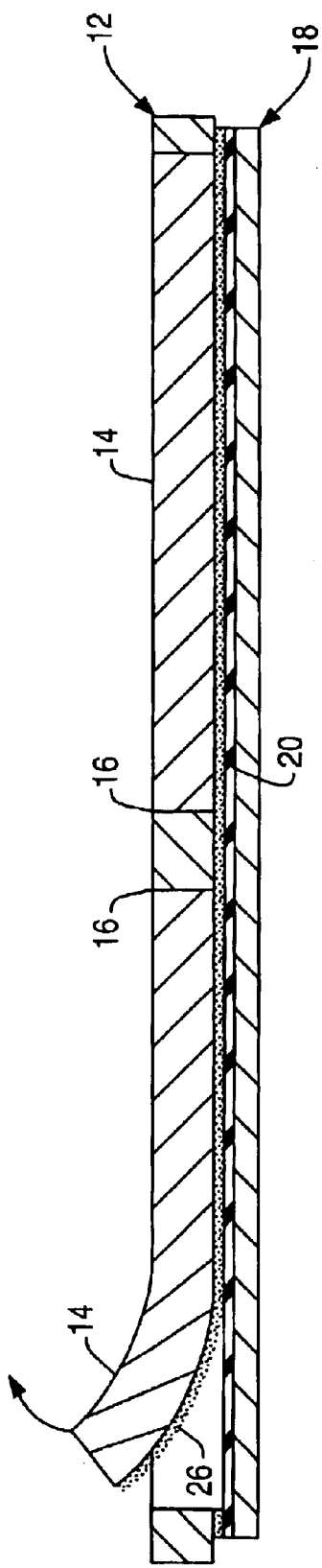
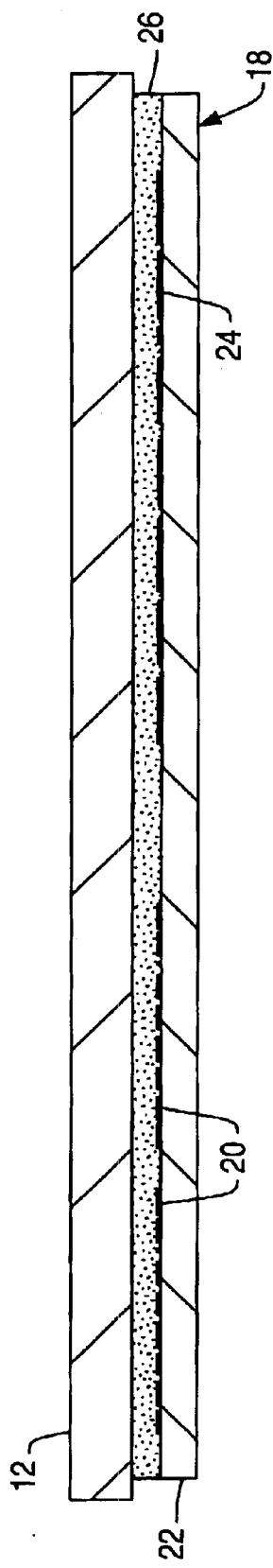

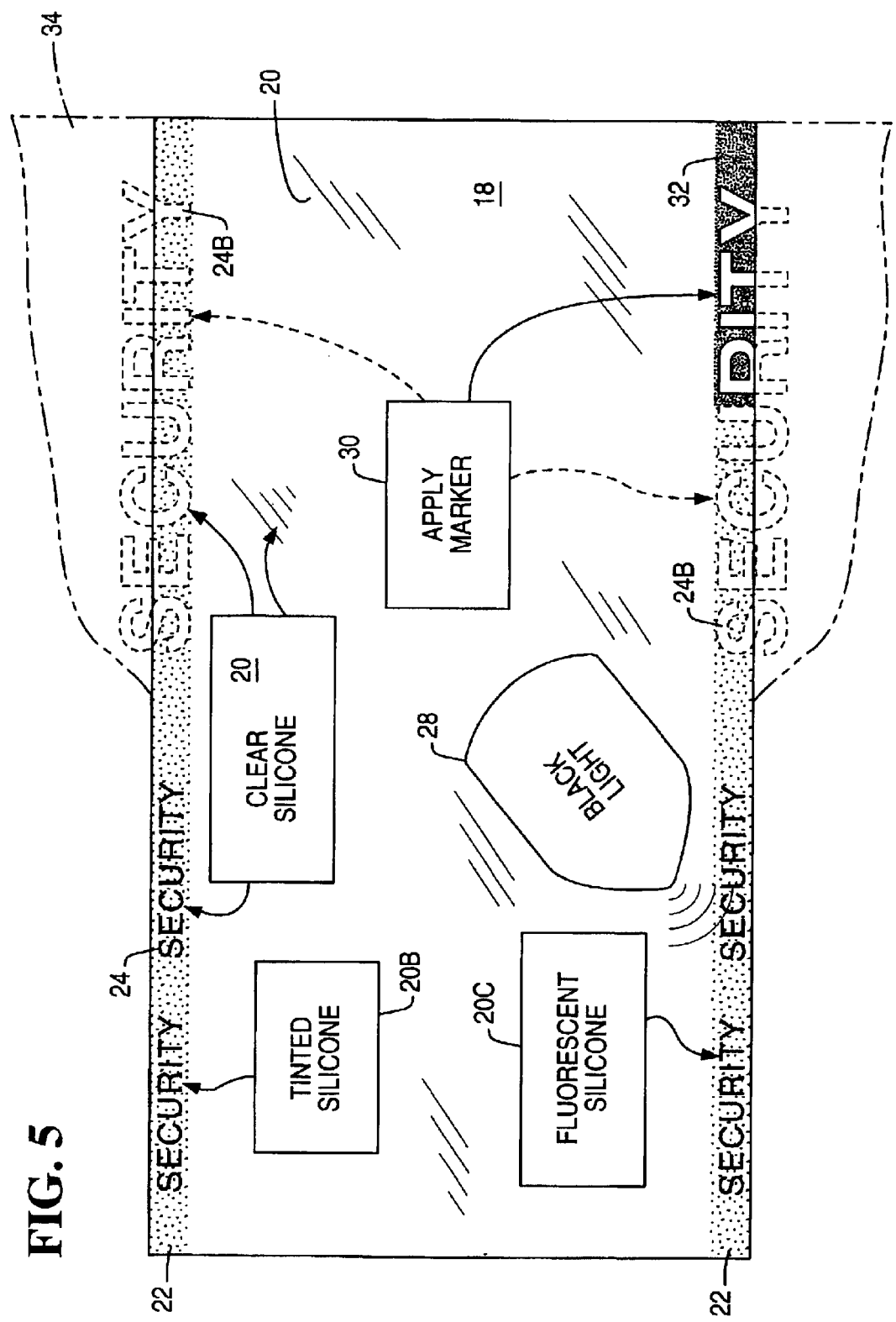

SECURITY LABEL LAMINATE

BACKGROUND OF THE INVENTION

The present invention relates generally to pressure sensitive labels, and, more specifically, to security features therein.

Pressure sensitive labels are ubiquitous and found in various forms and configurations. In a typical construction, a paper face sheet defines individual labels formed by perimeter diecuts therein. A release liner is laminated to the back of the face sheet by pressure sensitive adhesive therebetween.

The release liner has various forms, and in a common configuration includes supercalendared kraft (SCK) paper which is relatively thin and smooth and coated with liquid silicone and cured for forming a suitable release surface on which the pressure sensitive labels are removably bonded.

In use, any one or more of the individual labels may be printed in a suitable printer, and then simply peeled away from the underlying liner for reattachment to the intended surface. The pressure sensitive adhesive initially forms a removable bond with the release liner, but when applied to the intended surface typically forms a permanent bond therewith.

The various forms of label laminates is myriad in view of the various different requirements therefor. Different design objectives include different problems and different solutions reflected in the final design of the specific label laminate.

For example, the configuration of laminates for printing in ink-jet or laser printers is typically different since laser printers include a hot fusion roller which can lead to softening of the label adhesive during printer travel, and the laminate must be suitably designed to prevent premature delamination in the printer or undesirable release of the softened adhesive therein. Although the adhesive may be tailored to reduce heat softening in laser printers, this may undesirably increase its bonding characteristics which can increase the difficulty of removing labels from the liner.

One conventional solution for this problem is to use the desired pressure sensitive adhesive, but remove the silicone along one or more edges of the liner for providing a permanent bond between the face sheet and the liner. The permanent bond prevents delamination of the face sheet and liner during printer travel, and also prevents the liberation of heat-softened adhesive along the liner edge so locked-down by the omission of the silicone release agent therealong.

Another consideration in label laminate design is security. Many companies use various forms of label laminates tailored to specific uses typically in commercial transactions with customers. For example, mail order companies use customized label laminates for processing purchase transactions. A custom label laminate will include suitable identification of the company, an invoice or packing list documenting the commercial transaction, and shipping and return labels for transport of products.

Pharmaceutical forms or scripts are also custom tailored to the particular pharmaceutical company. These forms are specifically configured for completing the common pharmaceutical drug transaction with customers. A single form may be used to provide drug labels for the drug container, warning labels, use instructions for the drug, as well as documenting the purchase transaction.

Accordingly, genuine label laminates are originally manufactured to specifications for the intended commercial customer. And, the genuineness of the laminates is typically determined by the quality of the manufactured product, and the custom appearance of the product including the graphics, colors if any, and identification information for the intended commercial customer.

However, the fraudulent reproduction of custom manufactured label laminates is becoming easier today in view of the rapid advancements in computers and color printers, and associated equipment which may be used in the manufacture of label laminates.

Various forms of security features are found in various products including common commercial banking checks, travelers checks, paper money, and other commercial papers. However, typical security features increase the complexity and cost of these commercial papers, which costs are borne by the final user.

Accordingly, it is desired to provide a low-cost security feature in label laminates.

BRIEF SUMMARY OF THE INVENTION

A security laminate includes a face sheet laminated to a liner by an adhesive. The face sheet includes a removable label. The liner is covered with a release coating behind the label, and has a rim along one edge which is devoid of the release coating except for a security pattern therein.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 1 is a front view of a security laminate in accordance with an exemplary embodiment.

FIG. 2 is a back view of the laminate illustrated in FIG. 1, and a flowchart for an exemplary security use thereof.

FIG. 3 is a transverse sectional view of the laminate illustrated in FIG. 1 and taken along line 3—3.

FIG. 4 is a transverse sectional view of the laminate illustrated in FIG. 1 and taken along line 4—4.

FIG. 5 is a front view of the liner illustrated in FIG. 2 removed from the face sheet.

DETAILED DESCRIPTION OF THE INVENTION

Illustrated in FIG. 1 is a security label laminate 10 in accordance with an exemplary embodiment. The laminate includes a unitary face sheet 12 having one or more removable labels 14 therein. For example, two labels 14 are illustrated and specifically configured as shipping and return labels in an exemplary configuration. Each label is defined in the face sheet by a corresponding perimeter diecut 16 which permits individual removal of each of the labels from the common face sheet when desired.

FIG. 2 illustrates the back side of the laminate illustrated in FIG. 1 which includes a release liner 18 laminated to the upper back side of the face sheet. The liner 18 includes a front side substantially fully covered with a release agent or coating 20 in the preferred form of silicone which provides a full surface release surface behind both of the labels 14. The liner also includes a security lockdown narrow rim or border 22 along at least one edge of the liner, such as the bottom edge illustrated in FIG. 2. The liner rim is devoid of the release coating except for a security pattern 24 of the release coating locally formed within the narrow confines of the liner rim along the corresponding edge thereof.

An adhesive 26, such as conventional pressure sensitive adhesive, is laminated between the liner and the face sheet for permanent bonding to the label and removable bonding with the liner along the release coating. The adhesive fully covers the entire front surface of the liner for initially bonding together the liner and face sheet behind the corresponding labels 14.

Since the back side of the face sheet is devoid of the release coating, the laminated adhesive forms a permanent bond therewith and remains with the back side of each of the labels as they are individually removed or peeled away from the liner as illustrated in FIG. 1 for conventional use. For example, the laminate 10 illustrated in FIG. 1 is configured in the exemplary embodiment with an integrated form sheet 36 for documenting a commercial transaction. The two labels 14 may be specifically configured as shipping and return labels on which is suitably printed the corresponding addresses. And, the form sheet 36 is specifically configured for use in a laser printer having a hot fusion roller which typically heat-softens the adhesive as the laminate is carried through the printer during printing of the face sheet.

However, the liner rim 22 illustrated in FIG. 2 is devoid of the release coating, and therefore forms a substantially permanent bond with the opposing back side of the face sheet by the common adhesive laminated therebetween. In this way, the rim provides a lockdown feature along the edge of the liner for preventing delamination thereof during travel in the printer, as well as preventing liberation of the heat-softened adhesive due to the strong bond between the liner rim and face sheet.

The edgelock rim 22 illustrated in FIG. 2 provides a convenient feature for introducing security into the laminate for detecting whether the laminate is genuine as manufactured by the authorized manufacturer, or is fraudulent as reproduced by unauthorized sources. By substantially eliminating the release coating along the narrow liner rim, edge locking of the liner to the face sheet is provided, but by the simple introduction of a relatively minor portion of the release coating in the liner rim in a predetermined security pattern 24, a security feature may be introduced with little or no additional cost to the product.

The security pattern 24 is relatively simple and may be readily recognized by trained users, preferably without the use of any special equipment. Since the security pattern is merely preferentially positioned release coating, it is difficult to counterfeit, and is impervious to heat, chemicals, and mechanical modifications for enhancing its security value. And, the security pattern can be readily customized for individual customers in its location, size, and appearance, or lack thereof as further described hereinbelow.

As indicated above, the label laminate may be conventionally used for its specific labels 14 therein, yet can easily be provided with security features to ensure authenticity of manufacture by the original and authorized manufacturer thereof. Authenticity may be easily determined by simply peeling or carefully tearing the liner 18 away from the face sheet 12 along the liner rim 22 to expose to view the security pattern 24 which is devoid of the adhesive 26.

In the embodiment illustrated in FIG. 2, the adhesive 26 and liner 18 are suitably configured for permanently bonding the adhesive to the liner rim 22 over the security pattern 24, as well as to the back side of the face sheet 12. For example, the adhesive 26 may be typical pressure sensitive adhesive commonly found in pressure sensitive removable labels, and the liner may be SCK paper which is relatively thin and smooth. The pressure sensitive adhesive forms a strong or permanent bond with the back side of the face sheet, a weak or removable bond over the release coating on the front side of the release liner, and another strong or permanent bond along the liner rim 22 wherein it is devoid of the release coating. However, the security pattern 24 is formed by the release coating within the liner rim, and therefore the adhesive forms a weak or removable bond with the security pattern.

The release liner is therefore easily removable from the adhesive on the back side of the face sheet, with the adhesive remaining with the face sheet or labels therein. Since the liner rim 22 is devoid of the release coating, the permanent bond between the rim and the back side of the face sheet formed by the adhesive laminated therebetween may be broken as the liner is peeled away from the face sheet and tears the adhesive, with a portion of the torn adhesive remaining attached to the liner rim around the area occupied by the security pattern.

In use, the liner is peeled away from the face sheet to expose both the torn adhesive along the liberated liner rim 22, and the security pattern 24 from which the adhesive is removed during the tearing process. A portion of the adhesive thusly remains with the liner rim as it is peeled away from the face sheet, and this adhesive increases the contrast of viewing the security pattern 24 practically hidden therein.

The release coating illustrated in FIG. 2 may be conventional clear or transparent silicone which is not readily viewable to the user by its transparent quality. Similarly, the pressure sensitive adhesive 26 is also preferably clear or transparent and not readily viewable to the user. However, the clear adhesive surrounds the clear security pattern in the exposed liner rim and due to the different material characteristics of the silicone security pattern and the surrounding pressure sensitive adhesive an almost invisible distinction or contrast is created.

To the uninformed user, or fraudulent manufacturer, the distinction between the security pattern and adhesive can be readily overlooked in view of its nearly invisible characteristic. However, to the trained eye the security pattern may be distinguished from the surrounding adhesive for authenticating the label laminate.

FIGS. 3 and 4 illustrate exemplary transverse sections through the security laminate illustrated in FIG. 1. FIG. 3 represents a conventional section in which the face sheet 12 is laminated atop the release coating 20 of the liner 18 by the pressure sensitive adhesive 26 therebetween. The full surface adhesive 26 forms a removable bond with the full surface release coating 20 behind each of the labels 14 for permitting their individual removal from the face sheet and liner during use.

FIG. 4 illustrates a sectional view along the bottom liner rim 22 which is devoid of the release coating 20 except for the security pattern 24 formed by the release coating in relatively small area, and with relatively small size to prevent degradation of the edgelock performance of the liner rim 22. The security pattern may have any suitable configuration and preferably includes a series of features or elements spaced apart longitudinally along the liner rim for being readily exposed upon peeling of the liner rim away from the face sheet. The collective surface area of the security pattern is preferably a substantially minor portion of the entire surface area of the release-free liner rim 22 for maintaining the integrity of the edgelock feature thereof.

FIG. 5 illustrates in isolation the security liner 18 after being removed from the face sheet in the manner illustrated in FIG. 2. As indicated above, various forms of the security pattern 24 may be introduced for different advantages.

As shown in FIGS. 2 and 5, the security pattern 24 may have any suitable appearance such as a graphical scene or alphanumeric characters. The pattern is readily introduced by printing the release coating, such as liquid silicone which is then suitably cured during the original manufacture of the liner itself.

In one configuration illustrated in FIGS. 2 and 5, the security pattern is spaced inboard from the liner edge fully within the narrow liner rim 22. In this configuration, the security pattern may be extremely small or diminutive, yet is readily viewable to a trained observer.

As indicated above, the security pattern 24 may be formed of the same release coating 20 which covers the remainder of the front surface of the liner 18, and may be clear or transparent. Or, the security pattern may be formed of suitably tinted or colored silicone release coating, designated 20B in FIG. 5, which would be readily viewable to the naked eye upon removal of the liner rim from the face sheet.

FIG. 5 illustrates yet another embodiment of the security pattern in the form of fluorescent silicone, designated 20C. In this embodiment, the liner rim 22 would again be torn away from the face sheet to expose the fluorescent silicone security pattern, and then a blacklight 28 would be applied to shine on the exposed security pattern for fluorescing and therefore viewing the security pattern with enhanced contrast to the observer.

Since the clear silicone security pattern 24 embodiment is practically invisible to the untrained eye, its contrast may be enhanced by applying a marker 30 over the exposed liner rim 22 to increase contrast between the adhesive rim and the clear security pattern.

The marker 30 may be a permanent marker with permanent ink. However, in the preferred embodiment, the marker 30 applies a water-based marking fluid 32 of any suitable color over the exposed adhesive remaining on the liner rim 22. The water-based marking fluid is repelled by the silicone security pattern 24, but is absorbed by the exposed adhesive along the liner rim and substantially increases the contrast between the clear security pattern and the so-colored adhesive along the liner rim.

As indicated above, the face sheet illustrated in FIG. 1 preferably includes a plurality of the removable labels 14 spaced apart from each other. The liner 18 illustrated in FIG. 2 is laminated behind all of the labels on the face sheet, and includes two of the security rims 22 and the corresponding security patterns 24 therein. In FIG. 2, the security rims 22 extend the full width of the liner 18, and are disposed along the opposite top and bottom edges of the liner.

The left and right edges of the liner are provided without the edgelock rims, although in an alternate embodiment such rims could also be included to fully surround the entire liner. Since the two liner rims 22 provide lockdown of the liner to the face sheet, the remaining two edges of the liner without the edgelock rims improves the ability to initially peel the liner away from the face sheet along the lateral edges of the liner, followed in turn by tearing of the adhesive along one or both of the remaining two adhesive liner rims 22.

The introduction of the two adhesive rims illustrated in FIG. 5 permits another variation in the form of the security pattern, designated 24B. In this configuration, the security patterns 24B extend completely to the corresponding edges of the opposite liner rims 22. The security patterns 24B may therefore be configured in complementary patterns along those opposite edges of the liner.

For example, the upper security pattern 24B illustrated in FIG. 5 may be configured as a lower half-pattern of a common security pattern; with the lower security pattern 24B being configured in the complementary upper half-pattern which is different than the lower half-pattern, but corresponds therewith to complete the common pattern.

This configuration may be formed during the original manufacture of the liner 18 itself from a conventional roll 34 of liner material illustrated in part in phantom line in FIG. 5. A series of individual liners 18 are formed in a common and continuous roll, with the release coating 20 being suitably applied to the front surface of the liner in the desired patterns. The bands defining the corresponding liner rims 22 are devoid of the release coating except for the security patterns printed thereatop.

The release coating is applied to the liner roll to fully cover the surface thereof between the series of spaced apart bands defining the liner rims. The security pattern 24B may then be configured to straddle or bridge the corresponding edges of the liners produced after subsequent cutting thereof to size prior to lamination against corresponding face sheets.

In the exemplary embodiment illustrated in FIG. 5, the security pattern 24B is in the form of the word "SECURITY" which is about twice the height of the individual liner rims 22, and is therefore split in half between successive liners 18 in the roll 34 thereof. In this way, when the individual liners are cut from the roll 34, the security pattern is cut substantially in half forming corresponding upper and lower half-patterns on the corresponding liner rims of each liner.

Accordingly, when an individual release liner is laminated to the corresponding face sheet, the top liner rim 22 will include the lower half-pattern, and the lower liner rim will include the upper half-pattern of the correspondingly larger common security pattern.

This configuration has the additional benefit of increasing complexity of the security pattern itself, which is easily implemented in the original manufacture of the liner roll 34. And, since typical manufacturing tolerances are found in the cutting of the individual liners and in the assembly to the corresponding face sheets, alignment of the corresponding half-patterns in the corresponding liner rims is not a concern.

As shown in FIGS. 1 and 2, the face sheet 12 forms with the liner 18 a two-ply laminate including the security lockdown rims 22. The face sheet preferably extends below the liner in a single-ply to define the integral or unitary form sheet 36 therewith. The form sheet may be used for any suitable purpose, such as providing a packing list or invoice for documenting the commercial transaction.

In alternate embodiments, the common full length face sheet 12 and laminated, part-length liner 18 may be configured with various forms of one or more of the removable pressure sensitive labels 14, in various relative sizes, with the extending form sheet 36. For example, the laminate may be configured in the form of a typical pharmaceutical label-form or script with multiple labels atop the liner, with the liner including one or more of the security lockdown liner rims 22 disclosed above in its many embodiments.

Security may therefore be readily introduced in label laminates for ensuring the authenticity of the original manufacture of the laminate, and rendering fraudulent reproduction of the laminate more difficult and more readily detectable to trained observers.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A security laminate comprising:
    a face sheet including a removable label defined by a perimeter diecut;
    a liner covered with a release coating behind said label, and including a rim along one edge devoid of said release coating except for a security pattern of said release coating locally formed therein; and
    an adhesive laminated between said liner and face sheet for permanent bonding to said label and removable bonding with said liner along said release coating.

2. A method of using said laminate according to claim 1 comprising peeling said liner away from said face sheet along said liner rim to expose said security pattern devoid of said adhesive.

3. A laminate according to claim 1 wherein said adhesive and liner are configured for permanently bonding said adhesive to said liner rim over said security pattern.

4. A method of using said laminate according to claim 3 comprising:
    peeling said liner away from said face sheet along said liner rim to expose said security pattern devoid of said adhesive; and
    retaining a portion of said adhesive with said liner rim to increase contrast of said security pattern.

5. A laminate according to claim 3 wherein said security pattern comprises a series of elements spaced apart longitudinally along said liner rim.

6. A laminate according to claim 3 wherein said security pattern is spaced inboard from said liner edge within said liner rim.

7. A laminate according to claim 3 wherein said security pattern extends completely to said liner edge within said liner rim.

8. A laminate according to claim 3 wherein said liner includes two of said rims with complementary security patterns therein along opposite edges of said liner.

9. A laminate according to claim 8 wherein one of said security patterns includes a lower half-pattern and another one of said security patterns includes a different upper half-pattern corresponding with said lower half-pattern.

10. A laminate according to claim 3 wherein said security pattern comprises alphanumeric characters.

11. A laminate according to claim 3 wherein said security pattern comprises a graphical scene.

12. A laminate according to claim 3 wherein said release coating comprises silicone.

13. A laminate according to claim 12 wherein said security pattern comprises tinted silicone.

14. A laminate according to claim 12 wherein said security pattern comprises fluorescent silicone.

15. A method of using said laminate according to claim 14 comprising:
    peeling said liner away from said face sheet along said liner rim to expose said security pattern devoid of said adhesive; and
    applying a blacklight on said exposed security pattern to view said fluorescent silicone therein.

16. A laminate according to claim 3 wherein said security pattern comprises clear silicone.

17. A method of using said laminate according to claim 16 comprising:
    peeling said liner away from said face sheet along said liner rim to expose said security pattern devoid of said adhesive; and
    applying a marker over said liner rim to increase contrast between said rim and said security pattern.

18. A method according to claim 17 wherein said marker applies a water-based marking fluid over said rim, said fluid being repelled by said security pattern and absorbed by adhesive exposed along said liner rim.

19. A laminate according to claim 3 wherein:
    said face sheet includes a plurality of said removable labels; and
    said liner is laminated behind all of said labels, and includes two of said rims and security patterns therein.

20. A laminate according to claim 19 wherein said face sheet forms with said liner a two-ply laminate, and extends from said liner in a single-ply to define an integral form sheet.

* * * * *